(12) United States Patent
Nishitani (10) Patent No.: US 7,134,797 B2
(45) Date of Patent: *Nov. 14, 2006

(54) IMAGE PROCESSOR, IMAGE PROCESSING METHOD, AND COMPUTER PRODUCT

(75) Inventor: Katsuaki Nishitani, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/223,706

(22) Filed: Sep. 9, 2005

(65) Prior Publication Data

US 2006/0005727 A1 Jan. 12, 2006

Related U.S. Application Data

(63) Continuation of application No. 10/389,396, filed on Mar. 14, 2003, now Pat. No. 6,955,486.

(30) Foreign Application Priority Data

| Mar. 14, 2002 | (JP) | ............................ 2002-069637 |
| Apr. 17, 2002 | (JP) | ............................ 2002-115345 |
| Feb. 5, 2003 | (JP) | ............................ 2003-028714 |

(51) Int. Cl.
*B41J 11/44* (2006.01)
*B41J 5/30* (2006.01)
*G06F 15/00* (2006.01)

(52) U.S. Cl. ........................ 400/76; 400/61; 358/1.1; 358/1.9

(58) Field of Classification Search ................. 400/76, 400/61; 101/484; 358/468, 1.1, 1.9, 504, 358/518, 1.13, 1.17
See application file for complete search history.

(56) References Cited

U.S. PATENT DOCUMENTS

| 5,553,202 | A | 9/1996 | Wakabayashi et al. ...... 358/1.16 |
| 5,815,291 | A | 9/1998 | Shono et al. ................ 358/504 |
| 5,854,693 | A | 12/1998 | Yoshiura et al. ............. 358/468 |
| 6,044,173 | A | 3/2000 | Kumada ...................... 382/167 |
| 6,124,944 | A | 9/2000 | Ohta ........................... 358/1.9 |
| 6,137,595 | A | 10/2000 | Sakuyama et al. ........... 358/1.9 |
| 6,226,471 | B1 | 5/2001 | Tsuzuki ........................ 399/75 |

FOREIGN PATENT DOCUMENTS

EP 0876051 11/1998

(Continued)

*Primary Examiner*—Andrew H. Hirshfeld
*Assistant Examiner*—Wasseem H. Hamdan
(74) *Attorney, Agent, or Firm*—Cooper & Dunham LLP (57) ABSTRACT

A printer driver in an image processor includes a load distribution section that distributes load of the color matching processing in such a manner that a color matching processing section or a color printer executes the color matching processing. Moreover, a color matching processing section uses a profile stored in a profile holding section, to perform the color matching processing with respect to the color image data. Moreover, a profile holding section holds profiles of various images and a data converter converts color image data to a format suitable for the color printer.

9 Claims, 6 Drawing Sheets

U.S. PATENT DOCUMENTS

| | | | |
|---|---|---|---|
| 6,266,152 B1 | 7/2001 | Nakajima | 358/1.9 |
| 6,344,908 B1 | 2/2002 | Aritomi | 358/529 |
| 6,384,930 B1 | 5/2002 | Ando | 358/1.17 |
| 6,643,029 B1 | 11/2003 | Kumada et al. | 358/1.9 |
| 2001/0035967 A1 | 11/2001 | Tomomatsu | 358/1.9 |
| 2001/0043343 A1 | 11/2001 | Noguchi | 358/1.9 |
| 2002/0021458 A1 | 2/2002 | Saito et al. | 358/515 |
| 2002/0027669 A1 | 3/2002 | Nagatomi et al. | 358/1.9 |
| 2002/0097418 A1 | 7/2002 | Chang et al. | 358/1.13 |

FOREIGN PATENT DOCUMENTS

| | | |
|---|---|---|
| JP | 8138033 | 5/1996 |
| JP | 08-186724 | 7/1996 |
| JP | 8294014 | 11/1996 |
| JP | 10-315576 | 2/1998 |
| JP | 10336469 | 12/1998 |
| JP | 11328391 | 11/1999 |
| JP | 200050087 | 2/2000 |
| JP | 2000134209 | 5/2000 |
| JP | 2001047677 | 2/2001 |
| JP | 200197323 | 7/2001 |

IMAGE PROCESSOR, IMAGE PROCESSING METHOD, AND COMPUTER PRODUCT

CROSS REFERENCE TO RELATED APPLICATION

This application is a Rule 1.53(b) continuation of U.S. patent application Ser. No. 10/389,396, filed on Mar. 14, 2003, now U.S. Pat. No. 6,955,486, issued Oct. 18, 2005.

BACKGROUND OF THE INVENTION

1) Field of the Invention

The present invention relates to distributing load of the color matching processing between an image processor and a printer.

2) Description of the Related Art

A recorded original image is read by a color scanner to obtain image data, an image is output by a color printer based on the image data, to obtain an image similar to the original image in view of color as much as possible, or an image obtained by printing based on the image data obtained by the color scanner, and the image similar to the original image in view of color as much as possible are output by the color printer. In performing such color matching for matching the color of the two images, for example, a profile defining the correspondence between data representing each halftone dot % of CMYK and the color output based on the color data is used, and the image data is converted by using the profile, to thereby obtain an image expressed in a desired color.

As this type of color matching technique, for example, Patent Document 1 (Japanese Patent Application Laid-Open No. 11-328391) discloses an "image processor system" in which choices whether the color conversion processing is to be carried out at high speed, or at high accuracy is displayed on a monitor, and when color conversion at high accuracy is selected by a user, quadrangular pyramid interpolation is selected as an interpolation operation used together for the LUT (Look Up Table) in the color conversion processing, and when color conversion processing at high speed is selected by the user, cubic interpolation is selected to thereby perform color conversion processing.

Patent Document 2 (Japanese Patent Application Laid-Open No. 2000-050087) discloses an "image processor" in which input data depending on a color space of an input device is converted to color space data that does not depend on a device based on the observation condition on the input side by a conversion LUT, the data is converted to data in a human color perception color space by a normal transformer and color space-compressed, the color space-compressed data is converted to color space data that does not depend on a device based on the observation condition on an output side by an inverse transformer, and the data is converted to output data in a color space depending on an output device by the conversion LUT.

However, in the conventional art, since the color matching processing is performed either on a personal computer (printer driver) side or on a printer, when large data such as image data is subjected to color matching, color matching depends on the processing capability of the personal computer or the printer. Therefore, there is a problem in that if color matching is performed by a device having low processing capability, long processing time is required.

SUMMARY OF THE INVENTION

It is an object of the present invention to at least solve the problems in the prior art.

The image processor according to one aspect of the present invention comprises a color matching unit that performs color matching processing of the color image data; a load distribution unit that distributes load of the color matching processing so that the color matching processing is executed by any one of the color matching unit and the printer or both; and a transfer unit that transmits the color image data after the color matching processing or before the color matching processing to the printer.

The image processing method according to one aspect of the present invention comprises performing color matching processing of the color image data; distributing load of the color matching processing so that the color matching processing is executed by any one of the color matching step and the printer or both; and transmitting the color image data after the color matching processing or before the color matching processing to the printer.

The computer product according to still another aspect of the present invention realizes the method according to the present invention on a computer.

These and other objects, features and advantages of the present invention are specifically set forth in or will become apparent from the following detailed descriptions of the invention when read in conjunction with the accompanying drawings.

DETAILED DESCRIPTION

An exemplary embodiment of an image output system, to which the image processor, the image processing method, and the computer product according to the present invention are applied, is explained in detail, with reference to the accompanying drawings.

Figure 1:
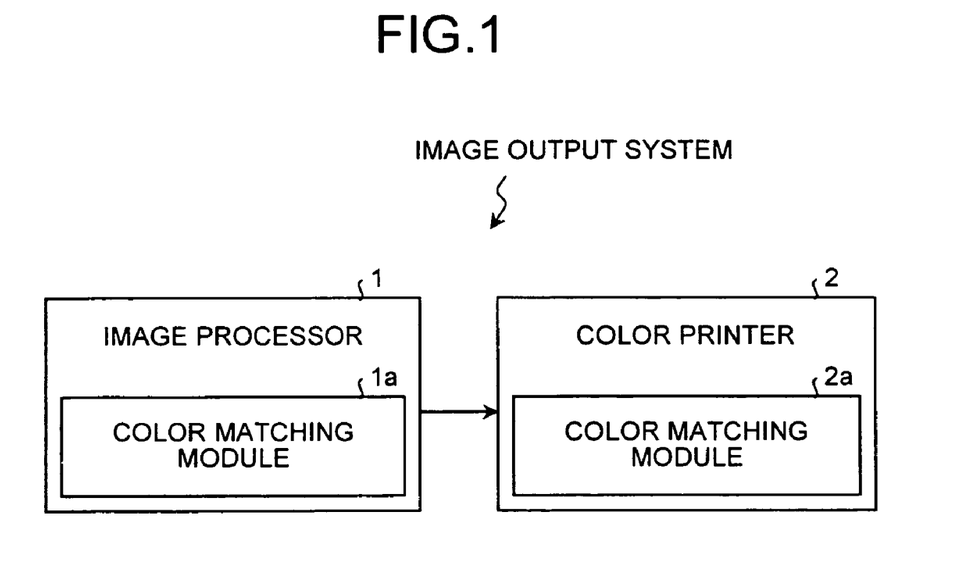
FIG. 1 shows a schematic configuration of an image output system according to one embodiment.

FIG. 1 shows a schematic configuration of the image output system according to this embodiment. The image output system shown in this figure comprises an image processor 1 having a color matching module 1a, that transmits color image data to a color printer 2 for printing, and the color printer 2 having a color matching module 2a, that receives the color image data transmitted from the image processor 1 and performs printing. The image processor 1 and the color printer 2 are connected by radio or wire.

Figure 2:
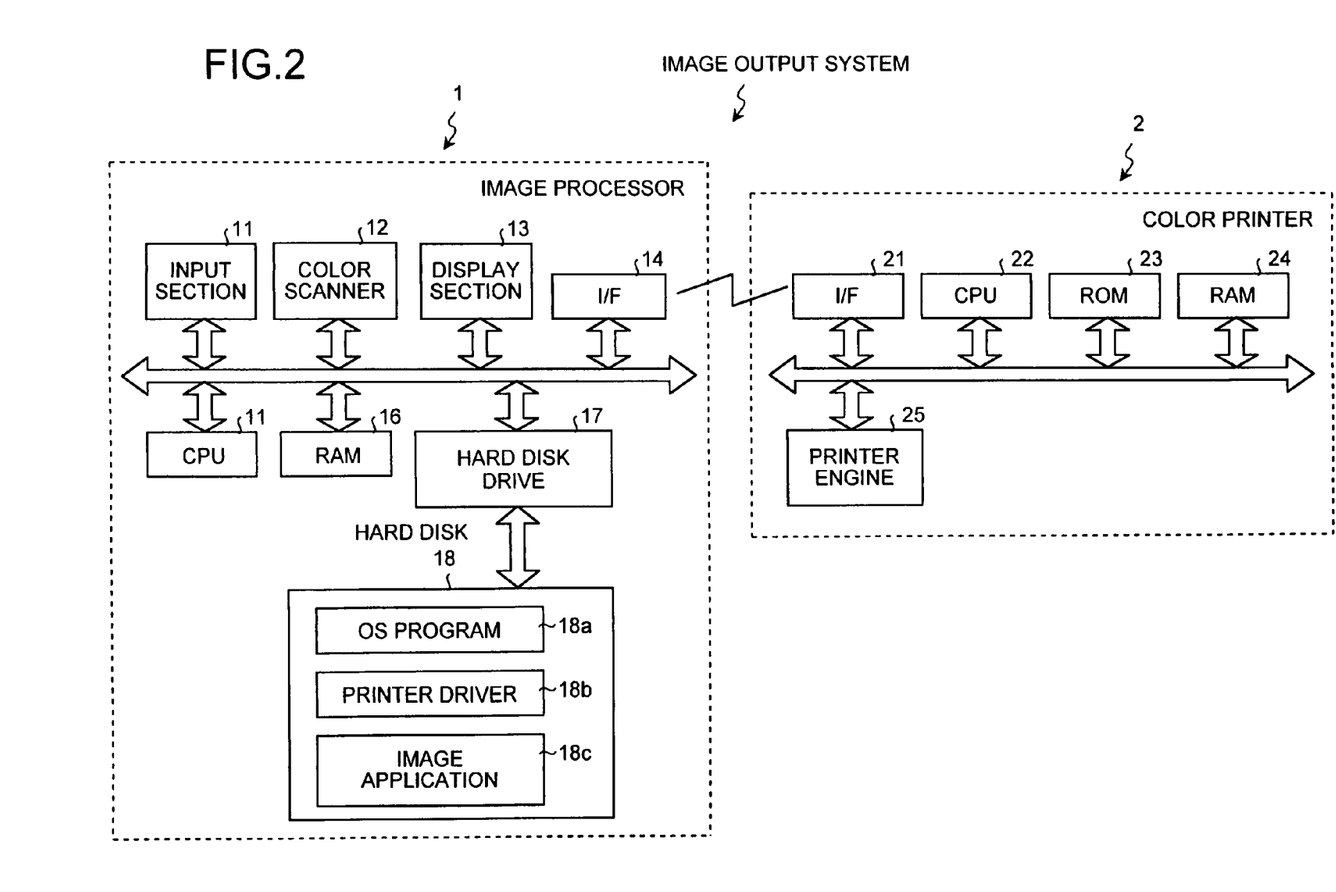
FIG. 2 shows a hardware configuration of the image output system in FIG. 1.

FIG. 2 shows a hardware configuration of the image output system in FIG. 1. The image processor 1 is formed of a personal computer, and as shown in FIG. 2, comprises, an input section 11 for inputting data, a color scanner 12, a display section 13, a printer I/F (interface) 14, that becomes an interface with the color printer 2, a CPU (Central Processing Unit) 15 that controls the whole image processor, a RAM (Random Access Memory) 16 used as a work area for the CPU 15, a hard disk drive 17 that performs read and write of data for a hard disk 18, and the hard disk 18 storing various programs for operating the CPU 15.

The input section 11 comprises, a keyboard including a cursor key, a numeric key, and various function keys, and a pointing device such as a mouse and a track pad for performing selection of the key or the like on a display screen in the display section 13. The input section 11 is a user interface, by which an operator gives an operation instruction to the CPU 14 or inputs data.

The color scanner 12 reads color images, and inputs digital image data of R (Red), G (Green), and B (Black).

The display section 13 is formed of a CRT (Cathode Ray Tube), LCD (Liquid Crystal Display), or the like, in which display corresponding to the display data input from the CPU 12 is performed. The printer I/F 14 is an interface for performing data transfer with the color printer 2.

The CPU 15 is a central controlling unit that controls the whole apparatus, according to the program stored in the hard disk 18. The CPU 15 is connected with the input section 11, the color scanner 12, the display 13, the I/F 14, the RAM 16, and the hard disk drive 17, for controlling data communication, read of an application program by accessing a memory, read and write of various data, data and command input, display, and the like.

The RAM 16 comprises a work memory for storing a specified program, input instructions, input data, processing results, and the like, and a display memory for temporarily storing display data to be displayed on the display screen in the display section 13.

The hard disk 18 stores various programs and data, such as an OS (Operating System) program 18a (for example, Windows (R)), a printer driver 18b corresponding to the color printer 2, an image application 18c for fetching an image by the color scanner 12 or performing image creation and editing, and the like.

A recording medium 17 is an optical, magnetic, or electric recording medium such as a floppy (R) disk, a hard disk, a CD-ROM (compact disc read only memory), a DVD-ROM (Digital Versatile Disc-Read Only Memory), and an MO (Magneto Optical disc) or PC card. The various programs are stored in the recording medium 17 in a data format readable by the CPU 15. The various programs may be recorded in the recording medium beforehand, or may be downloaded through a communication line and stored in the recording medium. The various programs can be distributed through the communication line.

The color printer 2 comprises as shown in FIG. 2, an I/F 21 for performing data communication, a CPU 22 for controlling the whole color printer 2, a ROM 23 for storing various control programs for operating the CPU 22, a RAM 24 for temporarily storing color image data input from the work area of the various control programs, the image processor 1, and the like, and a printer engine 25 for printing the color image data on transfer paper.

The I/F 21 is for performing data communication with outside, and for example, for performing data communication with the image processor 1.

The CPU 22 is a central controlling unit that controls the whole apparatus according to various control programs stored in the ROM 23. The CPU 22 is connected with the I/F 21, the ROM 23, the RAM 24, and the printer engine 25, for controlling data communication and printer operation.

The ROM 23 stores various control programs for operating the CPU 21, and parameters used for the processing. The control programs are, for example, a printing control program, a program for performing image processing including the color matching processing, a communication control program. The RAM 24 comprises a work memory for storing a specified control program, processing results, received color image data, and the like.

The printer engine 25 is formed of an electrophotographic color printer engine, and is a unit that prints the color image data on transfer paper.

Figure 3:
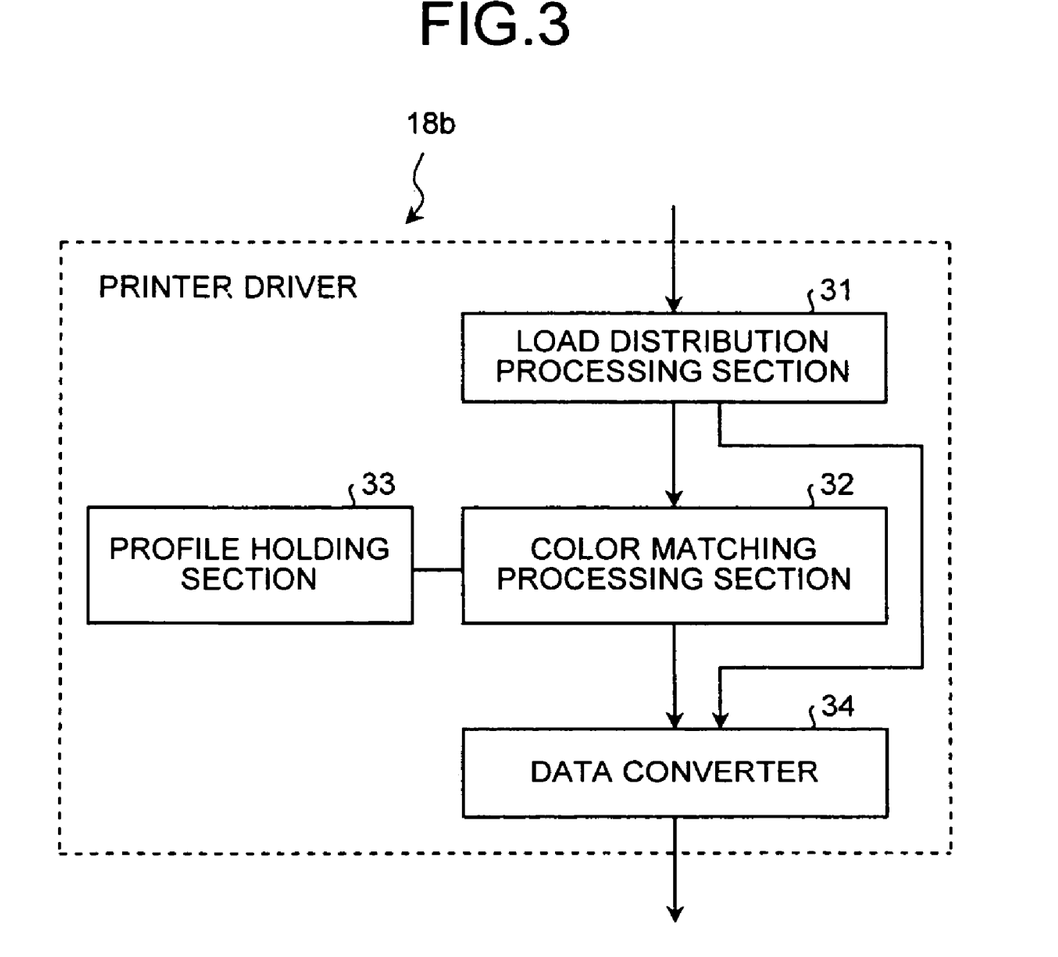
FIG. 3 is a functional block diagram of a printer driver in FIG. 2.

FIG. 3 shows a functional block diagram of the printer driver 18b in FIG. 2 (a diagram that shows the function, when the CPU 15 executes the printer driver 18b). The printer driver 18b comprises, a load distribution section 31 that performs load distribution processing in the color matching processing, so that a color matching processing section 32 or the color printer 2 executes the color matching processing, the color matching processing section 32 that uses a profile stored in a profile holding section 33, to perform the color matching processing with respect to the color image data, the profile holding section 33 for holding profiles of various images (for images, for graphics, for characters, for line drawings, and the like), and a data converter 34 that converts color image data to a format suitable for the color printer 2.

Figure 4:
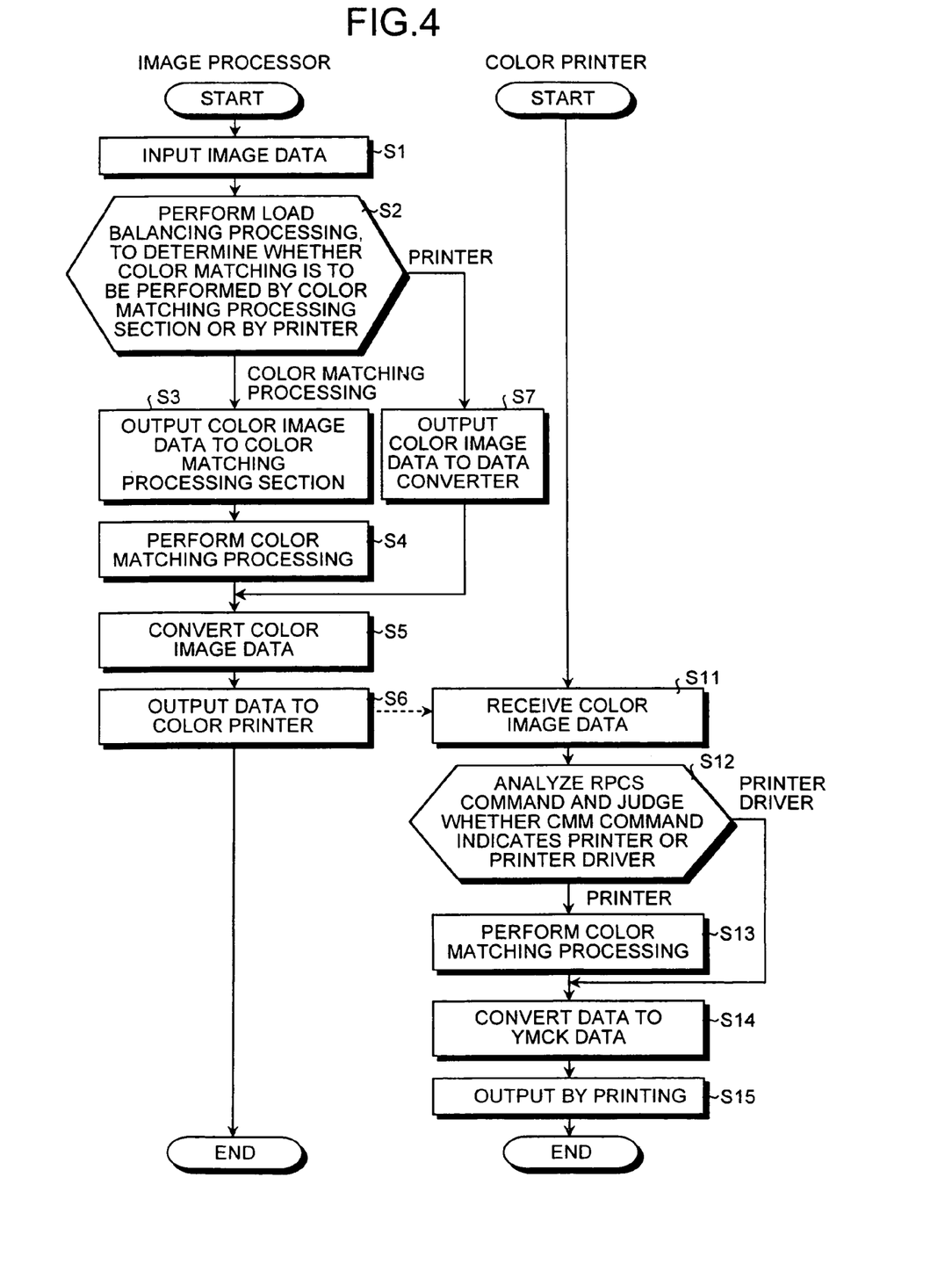
FIG. 4 shows a processing flow that explains printing operation of the image output system in FIG. 2.

FIG. 4 shows a processing flow that explains printing operation of the image output system in FIG. 2. In FIG. 3, in the printer driver 18b, when color image data (RGB data) is input from the image application 18c (step S1), the load distribution section 31 performs load distribution processing in the color matching processing, to determine whether the color matching processing is to be performed by the color matching processing section 32 or by the color printer 2 (step S2).

When it is determined that the color matching processing is to be performed by the color matching processing section 32, the load distribution 31 outputs the color image data to the color matching processing section 32 (step S3). The color matching processing section 32 uses the profile in the profile holding section 33 to perform the color matching processing in a unit of page with respect to the color image data, and outputs the color matching-processed color image data (R'G'B' data) to the data converter 34 in a unit of page (step S4). The data converter 34 converts the color image data to a format suitable for the color printer 2 in a unit of page (step S5), and outputs the data to the color printer 2 via the printer I/F 14 (step S6).

On the other hand, at step S2, when it is judged that the color matching processing is to be executed by the color printer, the load distribution section 31 outputs the color image data to the data converter 34 (step S7). The data converter 34 converts the color image data that has not been subjected to the color matching processing, to a format suitable for the color printer 2 in a unit of page, and outputs the data to the color printer 2 (step S6).

Figure 5:
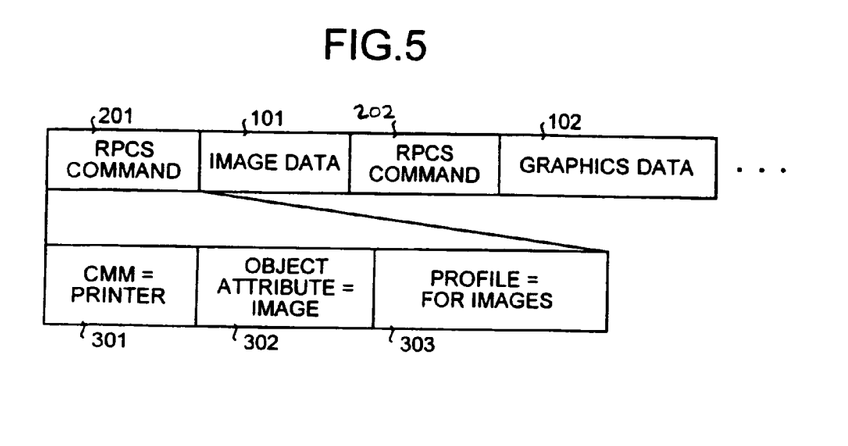
FIG. 5 shows one example of a format of color image data (1 page) after data conversion.

FIG. 5 shows one example of a schematic format of color image data (1 page) after data conversion by the data converter 34. The data converter 34 adds an RPCS (Refined Printing Command Stream) command for each type of the images in the color image data. The color image data shown in this figure comprises image data 101, graphics data 102, and the like, and RPCS commands 201 and 202 are added respectively to the respective data.

The RPCS command 201 includes a CMM (Color Management Module) command 301 specifying whether the color matching processing is to be executed by the printer driver or the printer, an object attribute command 302 indicating the image type in the color image data, and a profile command 303 specifying the profile to be used in the color matching processing. In the example shown in this figure, the CMM command 301 specifies the "printer", the object attribute command 302 indicates the "image", and the profile command 303 specifies "for images". The data converter 34 sets the CMM command 301, according to the load distribution judgment result in the color matching processing by the load distribution section 31. FIG. 5 shows one example of the color image data format, but the present invention is not limited to this format mode.

In the color printer 2, the color image data received through the I/F 21 is developed in the RAM 24 (step S11). The CPU 22 analyzes the RPCS command and judges whether the CMM command indicates the printer or the printer driver (step S12). When the CMM command 301 indicates the printer, the CPU 22 judges the object attribute command 302, and performs color matching processing with respect to the color image data developed in the RAM 24, referring to the profile command 303 (step S13), to convert the data to YMCK data (step S14), and then outputs the YMCK data by printing from the printer engine 25 (step S15).

On the other hand, at step S11, when the CMM command 301 indicates the printer driver, the CPU 22 converts the color image data to the YMCK data, and outputs the data by printing from the printer engine 25 (step S15).

First Example of Load Distribution Processing

Figure 6:
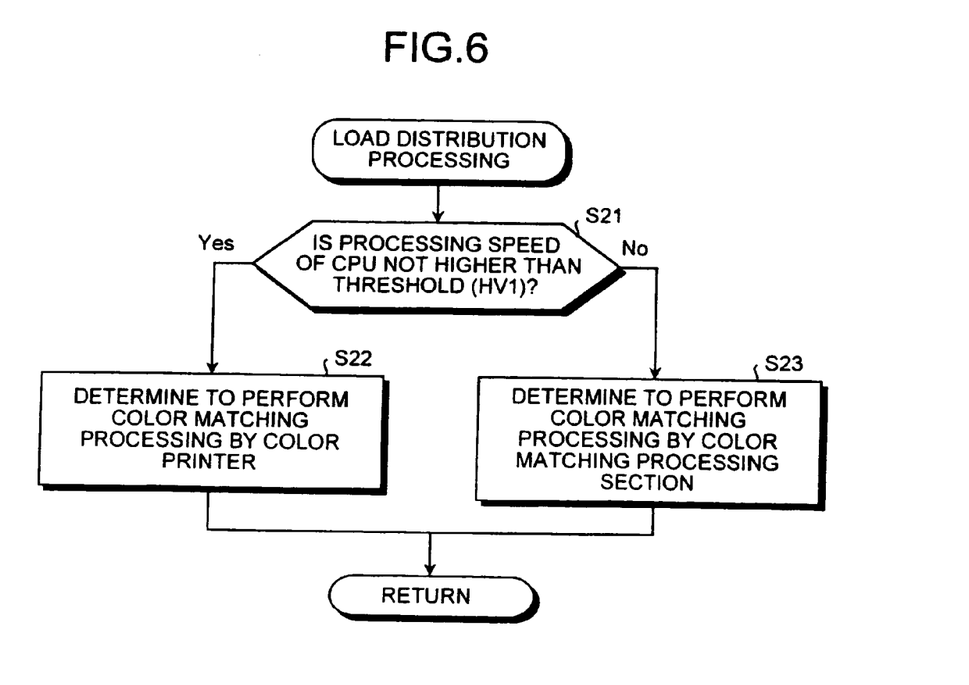
FIG. 6 shows a processing flow in a first example of a load distribution processing in FIG. 4.

FIG. 6 shows a processing flow in the first example of the load distribution processing (step S2) in FIG. 4. As shown in FIG. 6, the load distribution section 31 judges whether the processing speed of the CPU 15 is not higher than a threshold (HV1) (step S21), and if it is not higher than the threshold (HV1), determines to perform the color matching processing by the color printer 2 (step S22), and if the processing speed is higher than the threshold (HV1), determines to perform the color matching processing by the color matching processing section 32 (printer driver 18b) (step S23).

Second Example of Load Distribution Processing

Figure 7:
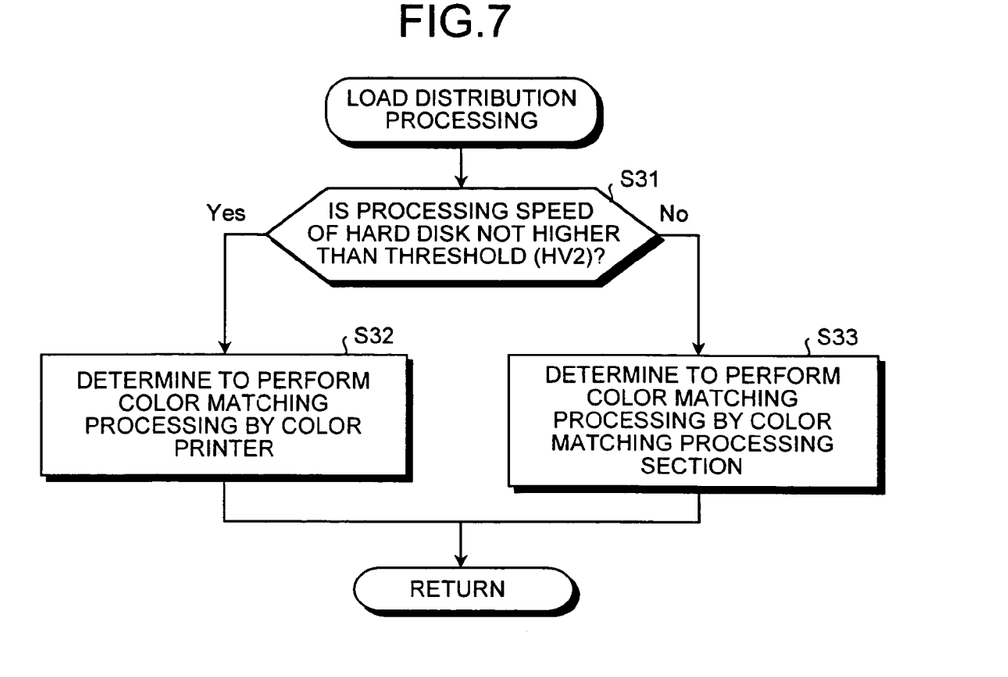
FIG. 7 shows a processing flow in a second example of the load distribution processing in FIG. 4.

FIG. 7 shows a processing flow in the second example of the load distribution processing (step S2) in FIG. 4. As shown in FIG. 7, the load distribution section 31 judges whether the speed of revolution of the hard disk 18 is not larger than a threshold (HV2) (step S31), and if it is not larger than the threshold (HV2), determines to perform the color matching processing by the color printer 2 (step S32), and if the speed of revolution of the hard disk 18 is larger than the threshold (HV2), determines to perform the color matching processing by the color matching processing section 32 (printer driver 18b) (step S33).

Third Example of Load Distribution Processing

Figure 8:
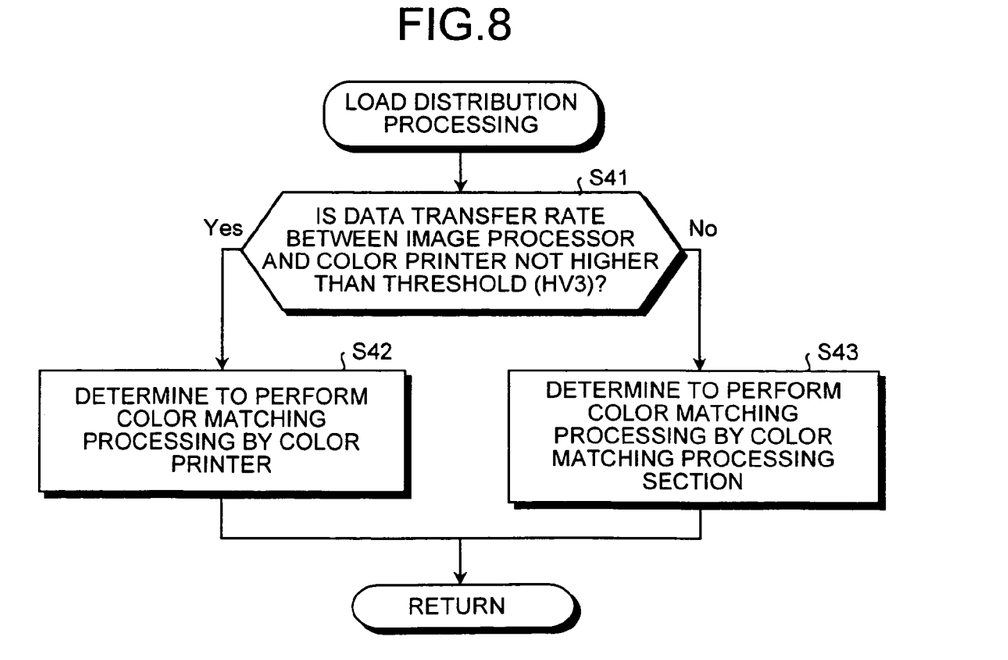
FIG. 8 shows a processing flow in a third example of the load distribution processing in FIG. 4.

FIG. 8 shows a processing flow in the third example of the load distribution processing (step S2) in FIG. 4. As shown in FIG. 8, the load distribution section 31 judges whether the data transfer rate between the image processor 1 and the color printer 2 is not larger than a threshold (HV3) (step S41), and if the data transfer rate is not higher than the threshold (HV3), determines to perform the color matching processing by the color printer 2 (step S42), and if the data transfer rate is higher than the threshold (HV3), determines to perform the color matching processing by the color matching processing section 32 (printer driver 18b) (step S43).

The processing speed of the CPU 15, the speed of revolution of the hard disk 18, the data transfer rate between the image processor 1 and the color printer 2 can be measured by a benchmark program or the like at the time of installation of the printer driver 18b, or at an optional point of time, and stored in the load distribution section 31.

In the embodiment (the first to third examples), the performance of the hardware is set to be a factor for load distribution in the color matching processing. However, it may be determined whether the color matching processing is to be performed by the color printer 2, or by the printer driver 18b, according to the size and the image type (image data, graphics data, character data and line drawing data) of the color image data.

The load distribution section 31 may perform the load distribution in the color matching processing in a unit of printing job, in a unit of page constituting the printing job, or in a unit of band constituting the page.

The load distribution section 31 may perform the load distribution in the color matching processing in a unit of image type (image data, graphics data, character data and line drawing data) of the color image data. For example, it may be set such that the color matching processing of image data and graphics having large data amount is performed by the color printer 2, and the color matching processing of character data and line drawing data having small data amount is performed by the printer driver 18b.

When color matching is performed by the image processor 1 and the color printer 2, the image processor 1 and the color printer 2 may hold the profiles for reproducing the hue of printers manufactured by other companies, so that the hue of printers of other companies can be reproduced. Thereby, a user having used a printer of another company can reproduce the hue familiar with the user.

With the image processor 1 and the color printer 2, color matching processing using a color cache may be performed. According to this method, at the time of carrying out large amount of color matching processing for images or the like, the images can be processed at high speed, using the color cache, thereby enabling an improvement of the overall throughput.

In the embodiment, the load distribution section 31 in the printer driver 18b distributes the load of the color matching processing between the printer driver 18b and the color printer 2, based on the performance of the hardware (processing speed of the CPU and the like) of the image processor 1. However, the load distribution section 31 may perform load distribution in the color matching processing, based on not only the processing capability of the image processor 1, but the processing capability of the image processor 1 and the processing capability of the color printer 2.

The user may specify load distribution in the color matching processing on a printer printing condition setting screen in the printer driver 18b, so that the load distribution section 31 performs load distribution in the color matching processing according to the specified content.

As described above, according to the embodiment, since the load distribution section 31 performs load distribution in the color matching processing by the printer driver 18b and the color printer 2, the color matching processing can be dispersed to the color printer 2 and the image processor 1, to carry out the color matching processing at high speed, thereby enabling an improvement in the overall throughput.

When the color printer 2 executes the color matching processing, a command instructing the execution of the color matching processing is added to the image data and transmitted to the printer, and hence load distribution in the color matching processing can be easily performed.

When the processing speed of the CPU 15 is higher than a predetermined value, the load distribution section 31 allows the printer driver 18b to execute the color matching processing, and when the processing speed of the CPU 15 of the own processor is not higher than the predetermined value, the load distribution section 31 allows the color printer 2 to execute the color matching processing. Therefore, when the processing speed of the CPU 15 in the image processor is slow, the color printer 2 can perform color matching.

When the speed of revolution of the hard disk 18 is higher than a predetermined value, the load distribution section 31 allows the printer driver 18b to execute the color matching processing, and when the speed of revolution of the hard disk 18 is not higher than the predetermined value, the load distribution section 31 allows the color printer 2 to execute the color matching processing. Therefore, when the speed of revolution of the hard disk 18 in the image processor 2 is low, the color printer 2 can perform color matching.

When the data transfer rate between the image processor and the printer is not lower than a predetermined value, the load distribution section 31 allows the printer driver 18b to execute the color matching processing, and when the data transfer rate between the image processor and the printer is lower than the predetermined value, the load distribution section 31 allows the color printer 2 to execute the color matching processing. Therefore, when the data transfer rate is low, the color printer 2 can perform color matching.

Since the load distribution section 31 performs load distribution in the color matching processing in a unit of page in the color image data, dynamic switching of load distribution becomes possible in one printing job.

Since the load distribution section 31 performs load distribution in the color matching processing in a unit of job of the color image data, at the time of parallel printing or substitute printing of a plurality of jobs, the overall throughput of the color printer 2 and the image processor 1 can be improved.

Since the load distribution section 31 performs load distribution in the color matching processing in a unit of band constituting the page of data transferred to the color printer 2, more detailed correspondence to the load distribution becomes possible, thereby enabling improvement in versatility.

Since the load distribution section 31 performs load distribution in a unit of image type of the color image data, appropriate load distribution becomes possible according to the image type, and hence the overall throughput of the color matching processing can be improved.

The present invention is not limited to the embodiment, and can be appropriately modified in a range that does not change the essential points of the present invention.

As described above, according to the image processor of the present invention, the load of the color matching processing is distributed between the image processor and the printer, thereby enabling high speed color matching processing.

Moreover, when the printer executes the color matching processing, the load distribution unit adds a command instructing the execution of the color matching processing to the color image data and transmits the data to the printer. As a result, load distribution in the color matching processing can be performed easily.

Furthermore, when the processing speed of the CPU in the image processor is not higher than a predetermined value, the load distribution unit allows the printer to execute the color matching processing, and when the processing speed of the CPU in the image processor is higher than the predetermined value, the load distribution unit allows the color matching unit to execute the color matching processing. As a result, when the processing speed of the CPU of the image processor is slow, the printer can perform color matching.

Moreover, when the speed of revolution of a hard disk in the image processor is not higher than a predetermined value, the load distribution unit allows the printer to execute the color matching processing, and when the speed of revolution of the hard disk in the image processor is higher than the predetermined value, the load distribution unit allows the color matching unit to execute the color matching processing. As a result, when the speed of revolution of the hard disk in the image processor is low, the printer can perform color matching.

Furthermore, when the data transfer rate between the image processor and the printer is not higher than a predetermined value, the load distribution unit allows the printer to execute the color matching processing, and when the data transfer rate between the image processor and the printer is higher than the predetermined value, the load distribution unit allows the color matching unit to execute the color matching processing. As a result, when the data transfer rate is low, the printer can perform color matching.

Moreover, the load distribution unit distributes the load of the color matching processing based on any one of the size and the type or both of the color image data. As a result, load distribution in the color matching processing becomes possible based on any one of the size and the type or both of the color image data.

Furthermore, the load distribution unit distributes the load of the color matching processing between the color image data in a unit of printing job. As a result, it becomes possible to improve the overall throughput of the printer and the image processor, at the time of parallel printing or substitute printing of a plurality of jobs.

Moreover, the load distribution unit distributes the load of the color matching processing in a unit of page in the color image data. As a result, dynamic switching of load distribution becomes possible in one printing job.

Furthermore, the load distribution unit distributes the load of the color matching processing in a unit of band constituting the page in the color image data. As a result, more detailed correspondence to the load distribution becomes possible, thereby enabling improvement in versatility.

Moreover, the load distribution unit distributes load of the color matching processing in a unit of image type of the color image data. As a result, the overall throughput of the color matching processing can be improved.

Furthermore, the image type is any one of image data, graphics data, character data, and line drawing data. As a result, color matching processing can be performed for each of the image data, graphics data, character data, and line drawing data.

Furthermore, the load distribution unit distributes load of the color matching processing according to an instruction of a user. As a result, load distribution in the color matching processing can be performed in response to the instruction of the user.

According to an image processing method of the present invention the color matching processing can be performed at high speed, by distributing the load of the color matching processing between the image processor and the printer.

According to the computer program of the present invention, the color matching processing can be performed at high speed, by distributing the load of the color matching processing between the image processor and the printer.

The present document incorporates by reference the entire contents of Japanese priority documents, 2002-069637 filed in Japan on Mar. 14, 2002, 2002-115345 filed in Japan on Apr. 17, 2002 and 2003-28714 filed in Japan on Feb. 5, 2003.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer readable medium having instructions stored therein, which when executed on a computer, causes the computer to perform operations comprising:
    transferring color image data to a printer having a color matching module for printing the data;
    performing color matching processing of the color image data;
    distributing load of the color matching processing so that the color matching processing is executed by any one of a color matching unit and the printer or both; and
    transmitting the color image data to the printer after the color matching processing or before the color matching processing; wherein
    when a processing speed of a central processing unit of the computer is less than or equal to a predetermined value, the load is distributed to the printer to execute the color matching processing, and
    when the processing speed of the central processing unit is higher than the predetermined value, the load is distributed to the color matching unit to execute the color matching processing.

2. The computer readable medium according to claim 1, wherein the determination whether to distribute the load to the printer or to the color matching unit is based on in addition any one of a size, a type, and both the size and the type, of the color image data.

3. The computer readable medium according to claim 1, wherein the determination whether to distribute the load to the printer or to the color matching unit is made per printing job of the color image data.

4. The computer readable medium according to claim 1, wherein the determination whether to distribute the load to the printer or to the color matching unit is made per page of the color image data.

5. The computer readable medium according to claim 1, wherein the determination whether to distribute the load to the printer or to the color matching unit is made per band as a part of a page of the color image data.

6. The computer readable medium according to claim 1, wherein the determination whether to distribute the load to the printer or to the color matching unit is made per image type of the color image data.

7. The computer readable medium according to claim 6, wherein the image type is any one of image data, graphics data, character data, and line drawing data.

8. The computer readable medium according to claim 1, wherein the determination whether to distribute the load to the printer or to the color matching unit is made in response to an instruction from a user.

9. A computer readable medium having instructions stored therein, which when executed on a computer, causes the computer to perform operations comprising:
    transferring color image data to a printer having a color matching module for printing the color image;
    performing color matching processing of the color image data;
    determining that the color matching processing is to be executed by any one of a color matching unit, the color matching module of the printer, and both the color matching unit and color matching module;
    transmitting color image data to the printer after the color matching processing or before color marching processing, based on the determination whether to distribute the load to the printer, to the color matching unit or to both, wherein
    when a processing speed of a central processing unit of the computer is less than or equal to a predetermined value, the load is distributed to the printer to execute the color matching processing, and
    when the processing speed of the central processing unit is higher than the predetermined value, the load is distributed to the color matching unit to execute the color matching processing.

* * * * *